Figure 1:
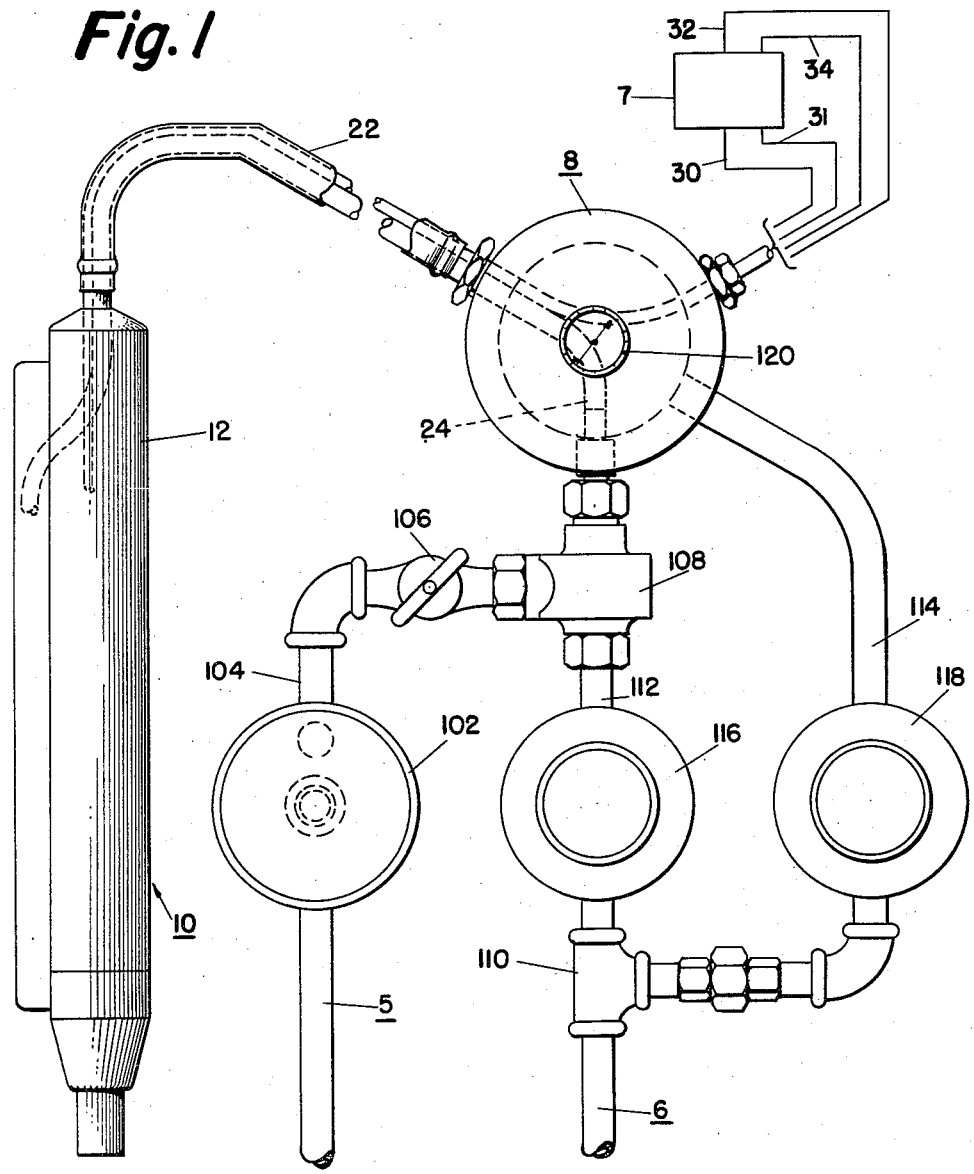

May 6, 1958 J. B. JONES ET AL 2,833,238
ULTRASONIC BRAZING UNIT
Filed July 26, 1956 2 Sheets-Sheet 1

INVENTORS
JAMES BYRON JONES
ALFRED L. FUCHS JR.
WILLIAM R. BAILEY
BY
Arthur H. Seidel
ATTORNEY May 6, 1958 J. B. JONES ET AL 2,833,238
ULTRASONIC BRAZING UNIT
Filed July 26, 1956 2 Sheets-Sheet 2
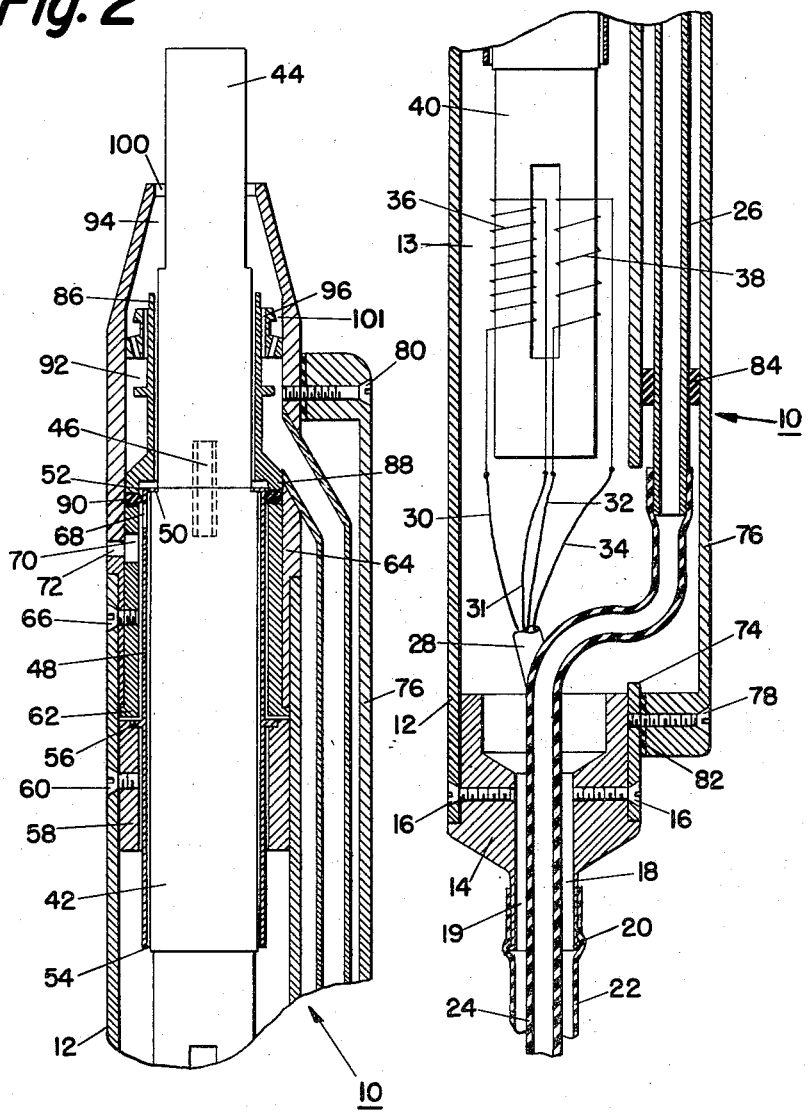
INVENTORS
JAMES BYRON JONES
ALFRED L. FUCHS JR.
WILLIAM R. BAILEY
BY Arthur H. Seidel
ATTORNEY

United States Patent Office 2,833,238
Patented May 6, 1958

2,833,238

ULTRASONIC BRAZING UNIT

James Byron Jones, West Chester, Alfred L. Fuchs, Jr., Broomall, and William Rugh Bailey, West Chester, Pa., assignors to Aeroprojects, Inc., West Chester, Pa., a corporation of Pennsylvania Application July 26, 1956, Serial No. 600,198

7 Claims. (Cl. 113—59)

The present invention relates to an ultrasonic brazing unit, and to a novel ultrasonic brazing method.

Brazing as a commercial joining process for metals has achieved a marked degree of success. In brazing, a nonferrous filler metal having a melting point above 800° F., but below that of the base metal is drawn into the joint. It is believed that the filler metal at least partially diffuses into the base metal and forms a new alloy therewith having new properties.

Brazing has a number of advantages in many applications over other joining processes. Thus, unlike the welds achieved by many types of welding processes, brazed joints are most frequently very thin, e. g. many brazed joints have a thickness of not more than 0.001 inch, and thus brazing is of utility for many end uses which cannot be adequately handled by welding. Soldering cannot be used, and brazing must be resorted to, in those applications where the joint is subjected to high temperature conditions, as for example the high temperature conditions encountered in air conditioning and refrigeration assemblies, in which the relatively low melting soldered joints will dissociate.

Prior brazing methods and devices have required the use of fluxes or gaseous atmospheres to prevent the formation, or to combine with, or to dissolve, or to inhibit, or to otherwise render ineffective unwanted products of the brazing operation which tend to impair the brazed joint or totally prevent brazing of the joint. Moreover, the flux facilitates the flow of the filler metal into the joint, and in those cases where needed, the flux suppresses the volatilization of high-vapor pressure constituents in the filler metal.

The use of fluxes, however, creates certain serious problems, particularly where corrosion is a critical factor. Thus, the flux frequently leaves contaminating material in the joint, accelerating or increasing the corrosion of the joint. Furthermore, the handling of the flux complicates the brazing technique, and slows down the formation of brazed joints.

This invention has as an object the provision of an ultrasonic brazing unit which may be used to effect brazed joints with high melting filler metals.

This invention has as another object the provision of an ultrasonic brazing unit which may achieve brazed joints with high melting filler metals without the use of fluxes.

The present invention has as yet another object the provision of a brazing method for joining together a plurality of metals using a nonferrous filler metal having a melting point above 800° F.

This invention has as yet another object the provision of a brazing method in which the use of fluxes is obviated.

Other objects will appear hereinafter.

For the purpose of illustrating the invention there is shown in the drawings a form which is presently preferred; it being understood, however, that this invention is not limited to the precise arrangements and instrumentalities shown.

Figure 1 is a schematic view of the brazing assembly and brazing unit of the present invention.

Figures 2 and 2a comprise a longitudinal section of the brazing unit of the present invention.

The component elements forming the brazing assembly of the present invention are shown schematically in Figure 1 and include a conduit from a combustion gas source designated by the numeral 5, a conduit from a source of air designated by the numeral 6, a generator for energizing a magnetostrictive transducer designated by the numeral 7, a connection manifold box designated by the numeral 8 and an ultrasonic brazing unit designated by the numeral 10.

The generator for energizing a magnetostrictive transducer, which is schematically designated by the numeral 7, may be of any suitable design known to those skilled in the art, such generators normally including a power supply, an oscillator for generating the frequency, an amplifier for raising the generated frequency to the requisite power level, and a direct current polarization source for biasing the magnetostrictive transducer.

The brazing unit 10 of the present invention includes a generally cylindrical housing 12 formed of tubular metal, whose interior forms chamber 13. Housing 12 is provided with cap 14 retained by means of a plurality of screws 16 which pass through the housing 12 and are threadably received in the cap 14. The interior of cap 14 comprises a channel 18 comprising a bore 19 which opens into chamber 13. A beaded or bulbous edge 20 is provided on the outer end of cap 14 over which a flexible rubber, or synthetic elastomeric, hose 22 is tightly fitted. A hose 24 of metal, rubber or elastomeric material of relatively small diameter is positioned within hose 22 and passes through channel 18 into chamber 13 within housing 12, wherein it is tightly fitted over metallic tube 26. A four-wire insulated electrical conductor designated 28 and formed of insulating material, such as rubberized fabric, is disposed within hose 22. Wires 30, 31, 32 and 34 extend from conductor 28. Wires 30 and 31 comprise the polarizing coil 36, and wires 32 and 34 the excitation coil 38 for magnetorestrictive transducer 40.

The magnetostrictive transducer 40 may comprise a laminated core of nickel, nickel-iron alloy, Permendur (an iron-cobalt alloy), Alfenol (an aluminum-iron alloy) or other magnetostrictive material, properly dimensioned to insure axial resonance with the frequency of the alternating current applied thereto so as to cause it to decrease or increase in length according to its coefficient of magnetostriction. The detailed construction of a suitable magnetostrictive transducer, which in the illustrated embodiment comprises a nickel stack is well known to those skilled in this art and does not form a part of the present invention, and accordingly no detailed description of its construction will be made herein. The desirability of magnetically polarizing nickel stack 40 by means of polarizing coil 36 in order for the metal laminations in nickel stack 40 to efficiently convert the applied R. F. energy from excitation coil 38 into elastic vibratory energy will be readily understood by one skilled in the art.

It will be appreciated by those skilled in the art, that in place of the magnetostrictive transducer 40 shown in the drawings, other transducers for elastic vibratory energy may be substituted. For example, piezoelectric transducers, such as the type using the piezoceramic formed from lead titanate and lead zirconate disclosed in United States Letters Patent 2,708,244 issued May 10, 1955, to Bernard Jaffe may be utilized.

The nickel stack 40 is metallically bonded in end-to-end contact as by silver brazing or the like to coupling bar 42, which is formed of metal, such as steel.

Brazing tip 44, which may be made from titanium metal, stainless steel or the like, is joined to coupling bar 42 by means of threaded bolt 46, which is received in matingly threaded female openings in coupling bar 42 and brazing tip 44. We have found that brazing tips formed of titanium are subject to less erosion than other metals when vibrating in many molten metals under brazing conditions, and that the use of such titanium tips substantially reduces the possibilities of producing unfavorable properties in the brazed joint.

The coupling bar 42 is supported by means of an Elmore mount, which mount is described in copending United States patent application Serial No. 517,599, filed June 23, 1955 in the name of William C. Elmore, entitled, "Vibratory Device." The Elmore mount comprises a cylindrical metal shell 48, such as a cylindrical steel shell or a shell of other suitable resonant material, said shell having a length of at least a single one-half wavelength according to the metal used at the applied frequency. Alternatively, shell 48 may have a length equal to a number of one-half wavelengths. In the illustrated embodiment, shell 48 has a length equal to a single one-half wavelength. Shell 48 surrounds coupling bar 42, being concentric therewith and spaced therefrom except at the lowermost end of coupling bar 42. At the lowermost end of coupling bar 42 there is a radially inwardly disposed shoulder 50 to which is joined by brazing or the like a radially inwardly directed flange 52 from shell 48. The end 54 of shell 48 opposite flange 52 is free from any attachment. A radially extending flange 56 projects outwardly from shell 48 at a point one-fourth wavelength from the end bearing flange 52 and the end 54 of this single one-half wavelength Elmore mount. Inasmuch as the end 54 of shell 48 is free from any attachment, when the system is vibrating, a true node will develop in the shell 48 at flange 56, which is one-quarter wavelength distant from the free end 54 of shell 48.

Flange 56 is secured as by brazing or welding to supporting ring 58 which is joined to housing 12 by means of connecting screws 60 which pass through apertures in housing 12 and are threadably received within supporting ring 58. A retainer sleeve 62 and a telescopically mating burner shroud 64 are also joined to housing 12 by means of screws 66.

An opening 68 is provided in shell 48 proximate the end carrying flange 52. Opening 68 is in gas communication with opening 70 in retainer sleeve 62. As shown in Figure 2, opening 68 is offset from opening 70 so that the air passageway formed by the annular space between coupling bar 42 and shell 48, which air passageway discharges through opening 68 into opening 70, is a tortuous one. Opening 70 is aligned with opening 72 in burner shroud 64, the opening 72 providing an exit to the atmosphere.

Housing 12 is provided with an opening 74 through which hose 24 passes. A moulding 76 is secured to housing 12 by means of screw 78, and to burner shroud 64 by means of screw 80. A pad 82 assures a good-appearing joint between housing 12 and moulding 76.

Tube 26 is supported intermediate housing 12 and moulding 76 by rubber spacer collet 84. As shown in Figure 2, tube 26 is anchored, as by brazing or welding to burner shroud 64, the tube 26 passing through the wall of burner shroud 64.

A burner screen 86 is positioned within burner shroud 64. The rear portion of burner screen 86 comprises an annular flange 88 which engages the inner wall surface of burner shroud 64. The end face of flange 88 acts as a seating surface for silicone O-ring 90. Silicone O-ring 90 is positioned intermediate the end of sleeve 62, the inner wall surface of shroud 64, the end face of annular flange 88 or burner screen 86, and the outer surface of shell 48, and forms a reasonably gas-tight seal between chamber 13 and burner screen 86.

Tube 26 is in gas communication with a chamber formed intermediate the inner surface of burner shroud 64 and the outer surface of the middle portion of burner screen 86. Chamber 92 is in gas communication with combustion chamber 94 by means of a series of longitudinal tubular passageways 96 together with the annular opening 101 between burner screen 86 and burner shroud 64.

The combustion chamber 94 embraces tip 44 and provides the locus wherein the ignition of the combustion gas from tube 26 is effected. The combustion chamber 94 discharges into the atmosphere through outlet 100.

The insertion and origin of the gaseous and electrical conduits which enter brazing unit 10 may best be understood by reference to Figure 1.

Combustible gas, which may be cooking gas or other low molecular weight normally gaseous inflammable hydrocarbons is introduced from gas conduit 5 through gas pressure regulator 102, conduit 104, and gas adjustment valve 106 into gas and air mixing T 108.

Air from air conduit 6 passes through T 110. From T 110 the air is channeled through separate conduits 112 and 114. The air within conduit 112 is transferred through air pressure regulator 116 and thence to gas and air mixing T 108.

The combined mixture of gas and air from gas and air mixing T 108 is conveyed by conduit 24 through connection box 8 and thence through hose 22. The air diverted from T 110 is conveyed through conduit 114, pressure regulator 118, and thence to connection box 8. Connection box 8 is provided with an air pressure gauge 120 permitting the operator to visually approximate the rate of flow of cooling air through connection box 8 into hose 22. Thus, the operator may adjust the rate of flow of cooling air through connection box 8 by adjusting air pressure regulator 118.

The requisite amount of cooking gas and air to achieve the desired extent of combustion within burner shroud 64 is obtained by adjustment of regulators 102 and 116, with further adjustment of the cooking gas supply being possible by adjusting gas adjustment valve 106. The requisite amount of cooling air to brazing unit 10 may be controlled by the adjustment of air pressure regulator 118.

Gaseous coolant, such as a stream of slightly compressed air is passed from collection box 8 through hose 22 into chamber 13 within housing 12 of brazing unit 10 and passes along the exterior surfaces of nickel stack 40 and coupling bar 42 intermediate the inner surface of shell 48 and the outer surface of coupling bar 42. This flow of air conducts heat away from coupling bar 42 and nickel stack 40, so that the operation of nickel stack 40 may be satisfactorily continued notwithstanding the fact that tip 44 may be heated to a white heat.

The heating of tip 44 is effected by the combustion of the gas and air mixture which enters the brazing unit 10 through hose 24 and passes therefrom through tube 26 into chamber 92. The gas-air mixture passes from chamber 92 through passageway 96 and 101 into combustion chamber 94.

The gas-air mixture is ignited in combustion chamber 94, and heats the brazing tip 44. The combustion gases are released through outlet 100. It is possible to operate the brazing unit 10 of the present invention with tip 44 at brilliant red heat, appreciably above 1400° F., the tip 44 being maintained at its elevated temperature by the combustion of gases within chamber 94.

In use, brazing is effected due to the rapid vibration of brazing tip 44, responsive to the vibration of coupling bar 42, which in turn is responsive to the vibration of nickel stack 40. Brazing without the use of flux may be achieved by vibrating the brazing tip 44 over a wide range of frequencies. With a metallic magnetostrictive transducer, operational utility may be had within the range of about 5,000 cycles per second and below to upwards of 75,000 cycles per second. With a piezoceramic transducer, operational utility may be had at frequencies greatly above 75,000 cycles per second.

The brazing unit 10 may be freely manipulated in a single hand of the operator, being unencumbered by a plurality of lines passing thereto. The temperature of brazing tip 44 may be regulated by controlling the amount of combined gas and air passed to cumbustion chamber 94, or by regulating the chemical composition of such mixture.

Brazing unit 10 may be used to effect brazing with nonferrous filler metal having a melting point above 800° F. without the use of fluxes, although in certain cases the use of fluxes may prove advantageous. It is thus possible to effect more efficient brazing with the brazing unit of the present invention than with prior brazing mechanisms, because the present unit eliminates the need for flux and all of the attendant problems encountered with the use of flux.

In many applications, particularly where brazing is effected on small work areas, external heating of the workpieces is not necessary, and the heat furnished to the tip 44 in the manner set forth above is adequate to effect brazing. In other cases, the workpieces may be heated separately, as in sheet work.

The present invention may be embodied in other specific forms without departing from the spirit or essential attributes thereof and, accordingly, reference should be made to the appended claims, rather than to the foregoing specification as indicating the scope of the invention.

We claim:

1. An ultrasonic brazing unit including a longitudinal and generally imperforate housing, transducer means for producing vibratory energy within said housing, a brazing tip coupled to said transducer means, said brazing tip projecting outside of said housing through an opening in the wall thereof, a gas burner disposed within said housing and embracing said brazing tip, a perforation in the wall of said housing spaced intermediate said transducer means and said gas burner, an inlet to said housing adjacent the end of said transducer means and remote from said brazing tip, insulated flexible electrical conductors extending through said inlet into said housing to said transducer means, a flexible conduit for conveying combustible gas to said gas burner extending through said inlet and said housing and secured to said gas burner, and a flexible conduit secured to said inlet, said flexible conduit embracing said insulated electrical conductors and said gas conduit and having sufficient free space therewithin to provide for the entry of cooling gas to the interior of said housing, means for propelling cooling gas through said housing, which cooling gas escapes from said housing through said perforation in the housing.

2. An ultrasonic brazing unit in accordance with claim 1 in which the transducer means comprises a magnetostrictive transducer.

3. An ultrasonic brazing unit including a longitudinal and generally imperforate housing, transducer means for producing vibratory energy within said housing, a brazing tip coupled to said transducer means by a coupling bar, said brazing tip comprising titanium, said brazing tip projecting outside of said housing through an opening in the wall thereof, a gas burner disposed within said housing and embracing said brazing tip, a perforation in the wall of said housing spaced intermediate said transducer means and said gas burner, an inlet to said housing adjacent the end of said transducer means remote from said brazing tip, insulated flexible electrical conductors extending through said inlet into said housing to said transducer means, a flexible conduit for conveying combustible gas to said gas burner extending through said inlet and said housing and secured to said gas burner, and a flexible conduit secured to said inlet, said flexible conduit embracing said insulated electrical conductors and said gas conduit and having sufficient free space therewithin to provide for the entry of cooling gas to the interior of said housing, means for propelling cooling gas through said housing, which cooling gas escapes from said housing through said perforation in the housing.

4. An ultrasonic brazing unit including a longitudinal and generally imperforate housing, transducer means for producing vibratory energy within said housing, a brazing tip coupled to said transducer means, said brazing tip projecting outside of said housing through an opening in the wall thereof, a gas burner disposed within said housing and embracing said brazing tip, said gas burner forming a compartment within said housing proximate said brazing tip and out of gas communication with the remainder of the interior of said housing, a perforation in the wall of said housing spaced intermediate said transducer means and said gas burner, an inlet to said housing adjacent the end of said transducer means remote from said brazing tip, insulated flexible electrical conductors extending through said inlet into said housing to said transducer means, a flexible conduit for conveying combustible gas to said gas burner extending through said inlet and said housing and secured to said gas burner, and a flexible conduit secured to said inlet, said flexible conduit embracing said insulated electrical conductors and said gas conduit and having sufficient free space therewithin to provide for the entry of cooling gas to the interior of said housing, means for propelling cooling gas through said housing, which cooling gas escapes from said housing through said perforation in the housing.

5. An ultrasonic brazing unit including a longitudinal and generally imperforate housing, magnetostrictive transducer means for producing vibratory energy within said housing, a brazing tip coupled to said transducer means, said brazing tip projecting outside of said housing through an opening in the wall thereof, said magnetostrictive transducer being spaced from the inner wall surface of said housing a sufficient distance to form a passageway between said magnetostrictive transducer and the inner wall surface of said housing, a coupler bar joined to said brazing tip and to said magnetostrictive transducer, a support mount joining said coupler bar to the interior of said housing, said support mount comprising a cylindrical shell at least a single one-half wavelength long according to the properties of the material and the frequency of operation, said support mount being spaced from and embracing said coupling bar and having an end attached to said coupling bar, the other end being free from attachment to establish a node once the transducer means is vibrating, attachment means extending from said support mount at said node to the interior of said housing, said cylindrical shell having a perforation therein, a gas burner disposed within said housing and embracing said brazing tip, a perforation in the wall of said housing spaced intermediate said transducer means and said gas burner and in gas communication with the perforation in said cylindrical shell, an inlet to said housing adjacent the end of said transducer means remote from said brazing tip, insulated flexible electrical conductors extending through said inlet into said housing to said transducer means, a flexible conduit for conveying combustible gas to said gas burner extending through said inlet and said housing and secured to said gas burner, and a flexible conduit secured to said inlet, said flexible conduit embracing said insulated electrical conductors and said gas conduit and having sufficient free space therewithin to provide for the entry of cooling gas to the interior of said housing, means for propelling cooling gas through said housing, which cooling gas escapes from said housing through said perforation in the housing.

6. An ultrasonic brazing apparatus including a generator for furnishing alternating current to a magnetostrictive transducer, a flexible combustion gas conduit, means in said combustion gas conduit for regulating the rate of flow of gas therethrough, a second flexible conduit having a relatively larger diameter than said combustion gas conduit, insulated electrical conductors from said generator, said flexible combustion gas conduit and insulated electrical conductors being disposed within said relatively large diameter second flexible conduit, a brazing unit comprising a longitudinal and generally imperforate housing, a magnetostrictive transducer within said housing, a brazing tip coupled to one end of said magnetostrictive transducer by a coupling bar, a gas burner disposed within said housing and embracing said brazing tip, said brazing tip projecting outside of said housing, said gas burner forming a compartment within said housing proximate said brazing tip and out of gas communication with the remainder of the interior of said housing, a perforation in the wall of said housing spaced intermediate said transducer and said gas burner, an inlet to said housing adjacent the end of said magnetostrictive transducer remote from said brazing tip, said relatively large diameter second flexible conduit engaged with said inlet, said insulated electrical conductors extending from said relatively large diameter second flexible conduit into said housing and connected to said magnetostrictive transducer, said flexible conduit embracing said insulated electrical conductors and said gas conduit with sufficient free space to provide for the entry of cooling gas to the interior of said housing, means for propelling cooling gas through said housing, and said flexible combustion gas conduit extending through said inlet and connected to said gas burner.

7. An ultrasonic brazing unit in accordance with claim 6 in which the brazing tip comprises titanium.

References Cited in the file of this patent

UNITED STATES PATENTS

| | | |
|---|---|---|
| 1,350,181 | Remane | Aug. 17, 1920 |
| 1,782,872 | Forster | Nov. 25, 1930 |
| 2,676,236 | Birkbeck et al. | Apr. 20, 1954 |